United States Patent
Dover et al.

(10) Patent No.: US 12,517,788 B2
(45) Date of Patent: Jan. 6, 2026

(54) MEMORY RECOVERY PARTITIONS

(71) Applicant: Micron Technology, Inc., Boise, ID (US)

(72) Inventors: Lance W. Dover, Fair Oaks, CA (US); Giuseppe Vito Portacci, Vimercate (IT); Giuseppe Ferrari, Naples (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/351,978

(22) Filed: Jul. 13, 2023

(65) Prior Publication Data

US 2024/0061748 A1    Feb. 22, 2024

Related U.S. Application Data

(60) Provisional application No. 63/399,143, filed on Aug. 18, 2022.

(51) Int. Cl.
*G06F 11/00*      (2006.01)
*G06F 11/14*      (2006.01)
*G06F 21/57*      (2013.01)
*G06F 21/60*      (2013.01)

(52) U.S. Cl.
CPC ........ *G06F 11/1417* (2013.01); *G06F 21/575* (2013.01); *G06F 21/602* (2013.01)

(58) Field of Classification Search
CPC .. G06F 11/1417; G06F 11/142; G06F 11/143; G06F 11/301; G06F 11/0712; G06F 11/3058; G06F 11/3062
See application file for complete search history.

(56) References Cited

U.S. PATENT DOCUMENTS

2016/0117225 A1*  4/2016  Yu .................. G06F 11/1666
                                                                    714/15

* cited by examiner

*Primary Examiner* — Katherine Lin
(74) *Attorney, Agent, or Firm* — Holland & Hart LLP (57) ABSTRACT

Methods, systems, and devices for memory recovery partitions are described. A memory system may include a memory array configured with one or more logical partitions. In some examples, a primary boot image may be stored to a first logical partition and a recovery boot image may be stored to a second logical partition. During a boot operation, the memory system may determine whether the primary boot image includes one or more errors. If the primary boot image includes relatively few (or no) errors, the memory system may boot using the primary boot image. If the primary boot image includes a relatively high quantity of errors (e.g., higher than a threshold quantity of errors), the memory system may autonomously load a recovery boot image stored to the second logical partition.

20 Claims, 5 Drawing Sheets

MEMORY RECOVERY PARTITIONS

CROSS REFERENCE

The present application for patent claims priority to U.S. Provisional Patent Application No. 63/399,143 by Dover et al., entitled "MEMORY RECOVERY PARTITIONS" and filed Aug. 18, 2022, which is assigned to the assignee hereof and is expressly incorporated by reference herein.

FIELD OF TECHNOLOGY

The following relates to one or more systems for memory, including memory recovery partitions.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A memory system may include one or more arrays of memory cells (e.g., NAND memory cells) and a memory controller. In some examples, an array of memory cells may include one or more partitions (e.g., logical partitions) associated with a range of respective addresses (e.g., a range of logical addresses). Traditionally, one of the logical partitions may be designated as a primary partition to store a boot image (e.g., data, code) that is used to boot the memory system or a computing system that the memory system exists within. Moreover, one or more of the logical partitions may be designated as recovery partitions to store redundant copies of the boot image for reliability purposes, or may otherwise be utilized to update the primary boot image. For example, when updating the primary boot image, the updated boot image may be written to one of the recovery partitions and the recovery partition may subsequently be designated as the primary partition.

However, in such examples, switching between partitions used to boot the memory system is a manual process. That is, upon storing an updated boot image (e.g., updated data, updated code) to a recovery partition, the memory controller may receive a command to designate the recovery partition as the primary partition. Thus, if the primary partition becomes corrupt (e.g., if the data stored to the primary partition becomes corrupt), the memory system may experience a catastrophic error and may not have the ability to designate a recovery partition as the primary partition. Additionally or alternatively, even if the memory system was able to verify the integrity of data stored to a primary partition before or during a boot process (e.g., using a boot image stored to read-only memory (ROM), the memory system may still have switched between partitions manually, thus leading to a generally inflexible system architecture. Accordingly, a memory system configured to autonomously load a recovery partition may be desirable.

A memory system configured to autonomously load a recovery partition is described herein. In some examples, a memory system may include a memory array having one or more logical partitions. The memory system may be configured such that one partition (e.g., a primary partition; a partition operating in the foreground of the memory system) is accessible at a time. The other partitions (e.g., recovery partitions; partitions operating in the background of the memory system) may at least temporarily inaccessible. As described herein, during a boot process, the integrity of the boot image (e.g., the data, the code) stored to the primary partition may be verified. If the boot image includes a relatively low quantity of errors (or no errors), the memory system may be booted using the boot image stored to the primary partition. However, if the boot image includes a relatively high quantity of errors (e.g., higher than a threshold quantity of errors), the memory system may autonomously load a backup boot image stored to a recovery partition.

Moreover, when updating the primary boot image, the memory system may write the updated boot image to a partition other than the primary partition or the recovery partition. Accordingly, upon writing the primary boot image to the partition, the memory system may designate (e.g., re-designate) the primary and recovery partitions. By autonomously loading recovery partitions and updating boot images as described herein, the flexibility of the system's architecture may be improved and the system may avoid or mitigate catastrophic errors that would otherwise occur due to a manual-partition-shifting process.

Figure 1:
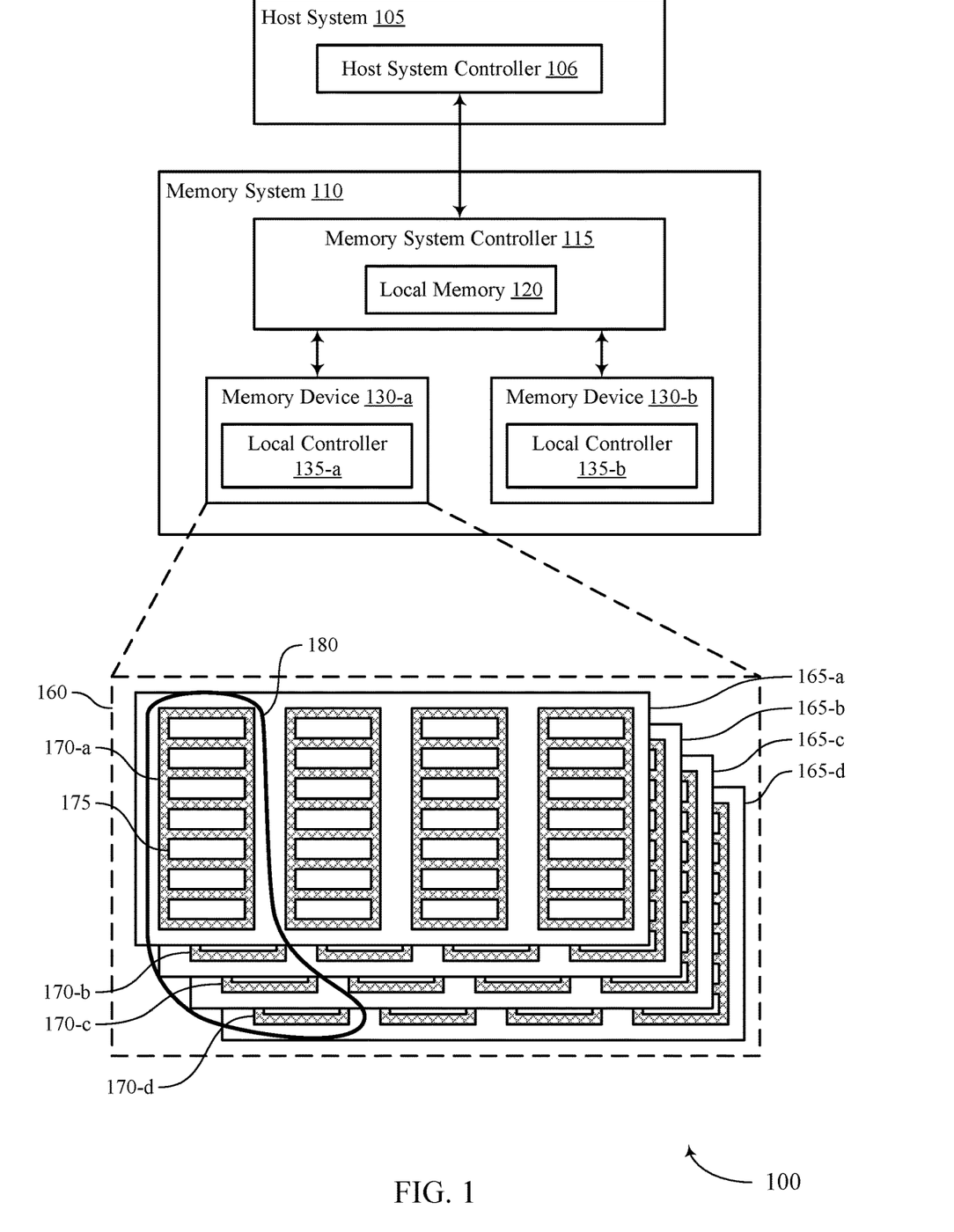
FIG. 1 illustrates an example of a system that supports memory recovery partitions in accordance with examples as disclosed herein.

Features of the disclosure are initially described in the context of systems, devices, and circuits with reference to FIG. 1. Features of the disclosure are described in the context of systems and process flow diagrams with reference to FIGS. 2 and 3. These and other features of the disclosure are further illustrated by and described in the context of an apparatus diagram and flowchart that relate to memory recovery partitions with reference to FIGS. 4 and 5.

FIG. 1 illustrates an example of a system 100 that supports memory recovery partitions in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MHLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support memory recovery partitions. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, a memory system 110 may include a memory device 130 having one or more logical partitions. The memory system 110 may be configured such that one partition (e.g., a primary partition; a partition operating in the foreground of the memory system) is accessible at a time. The other partitions (e.g., recovery partitions; partitions operating in the background of the memory system) may at least temporarily inaccessible. As described herein, during a boot process, the integrity of the boot image (e.g., the data, the code) stored to the primary partition may be verified. If the boot image includes a relatively low quantity of errors (or no errors), the memory system may be booted using the boot image stored to the primary partition. However, if the boot image includes a relatively high quantity of errors (e.g., higher than a threshold quantity of errors), the memory system 110 may autonomously load a backup boot image stored to a recovery partition.

Moreover, when updating the primary boot image, the memory system 110 may write the updated boot image to a partition other than the primary partition or the recovery partition. Accordingly, upon writing the primary boot image to the partition, the memory system 110 may designate (e.g., re-designate) the primary and recovery partitions. By autonomously loading recovery partitions and updating boot images as described herein, the flexibility of the system's architecture may be improved and the memory system 110 may avoid or mitigate catastrophic errors that would otherwise occur due to a manual-partition-shifting process.

Figure 2:
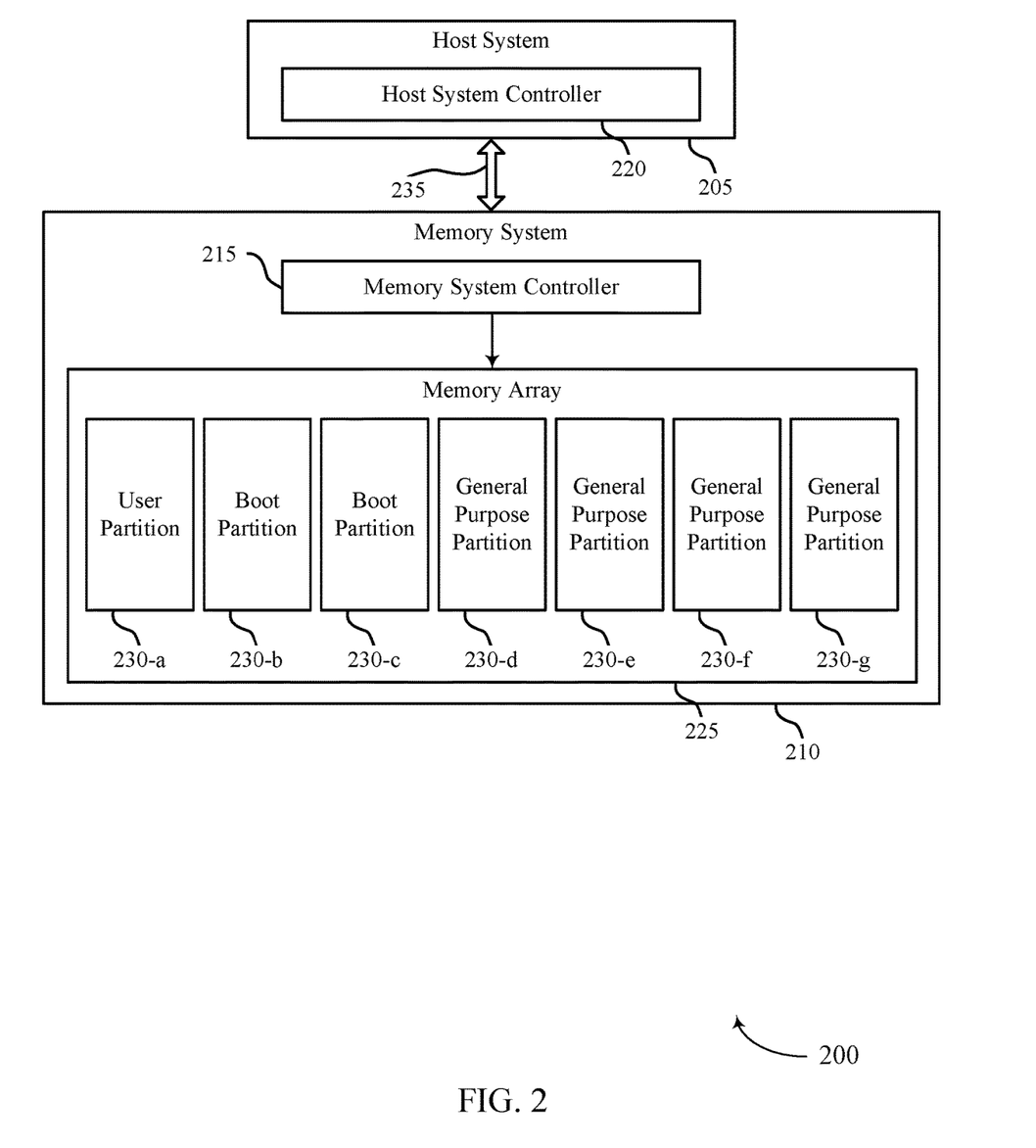
FIG. 2 illustrates an example of a system that supports memory recovery partitions in accordance with examples as disclosed herein.

FIG. 2 illustrates an example of a system 200 that supports memory recovery partitions in accordance with examples as disclosed herein. The system 200 may be an example of a system 100, and may implement aspects of the system 100 as described with reference to FIG. 1. For example, host system 205 and memory system 210 may be examples of host system 105 and memory system 110, respectively, as described with reference to FIG. 1. Additionally or alternatively, the system 200 may be referred to as a computing system 200. In some cases, the memory system 210 may be configured to autonomously (e.g., automatically) load a boot image from a recovery partition upon detecting an error when loading a boot image from the primary partition. By autonomously loading recovery partitions, the memory system 210 may provide a flexible architecture and catastrophic errors that would otherwise occur due to a manual-partition-shifting process may be mitigated.

The system 200 may include the host system 205 and the memory system 210, where the host system 205 may be configured to communicate (e.g., via an interface 235) with the memory system 210. The host system 205 may include a host system controller 220, which may be an example of the host system controller 106, as described with reference to FIG. 1. The host system controller 220 may be configured to transmit commands (e.g., boot commands) to the memory system 210. The memory system 210 may include a memory system controller 215 which may be an example of memory system controller 115, as described with reference to FIG. 1. The memory system controller 215 may be configured to receive the commands from the host system controller 220. In some examples, the memory system 210 may be an example of an embedded multimedia card (eMMC).

The memory system 210 may also include a memory array 225. The memory array may include a plurality of memory cells (e.g., one or more banks of memory cells that each include one or more memory cells). The memory array 225 may include one or more logical partitions 230. As described herein, each logical partition 230 may be associated with a respective range of logical addresses. The memory system 210 may be configured such that one partition 230 (e.g., a primary partition) is operating in the foreground at any given time. That is, the partition 230 operating in the foreground may be accessible by the memory system controller 215 and the other partitions 230 (e.g., the secondary partitions, the recovery partitions) may operate in the background and thus be temporarily inaccessible. Accordingly, each partition 230 may be associated with a same or similar range of logical addresses, but only physical addresses corresponding to the logical address of the partition 230 operating in the foreground may be accessible at any given time.

In some cases, the logical partitions 230 may be initially configured such that each logical partition 230 is associated with different data, different types of operations, or both. For example, the memory array 225 may include logical partitions 230 configured as a user partition 230-$a$ (e.g., associated with storing user data), a boot partition 230-$b$ and a boot partition 230-$b$ (e.g., a bootable area that is configured to store a boot image), and general purpose partitions 230-$d$ through 230-$g$. In some examples, however, one or more of the logical partitions 230 may be reconfigured for use as bootable areas, or configured to store different types of data or data associated with different types of operations.

In some examples, one of the logical partitions 230 may be designated as a primary partition to store a boot image (e.g., data, code) that is used to boot the memory system 210 or the computing system 200. For example, the boot partition 230-$b$ may be designated as the primary partition. The boot image (e.g., the primary boot image, the first boot image) may be stored to the boot partition 230-$b$ during a manufacturing process or based on a command received from the host system 205 (e.g., during an installation process). Additionally or alternatively, the memory system controller 215 may configure (e.g., during a configuration stage) one or more partitions as a recovery partition. For example, the boot partition 230-$c$ may be designated as a recovery partition. As described herein, recovery partitions may be utilized to store a copy of the primary boot image, or may be utilized when updating the primary boot image.

When the memory system 210 (or computing system 200) transitions power states (e.g., turns on), the primary boot image may be loaded from the boot partition 230-$b$. As described here, the memory system controller 215 may determine whether the boot image includes one or more errors to prevent or mitigate failure of the memory system 210. In some cases, during the configuration stage, the memory system controller 215 may define one or more metrics (e.g., integrity metrics) for determining whether the boot image includes one or more errors. For example, the memory system controller 215 may generate a trusted cryptographic digest for the primary boot image.

During the boot stage, a cryptographic digest for the primary boot image may be generated and compared with the trusted cryptographic digest to determine whether to boot the primary boot image. Accordingly, during the configuration stage, the memory system controller 215 may select a hashing function for generating the trusted cryptographic digest. The hashing function may be selected based on one or more metrics such as desired system, desired system security, and other similar metrics.

In some cases, after the configuration stage, the host system controller 220 may transmit a command (e.g., a boot command) to the memory system controller 215 to initiate the boot operation (e.g., booting stage). Accordingly, the memory system 210 may transition from a first power state (e.g., a low power state, a reduced power state, an off state, a deep sleep state) to a second power state (e.g., an active state, an on state) in response to receiving the boot command. Upon transitioning power states, the memory system controller 215 may measure the primary boot image prior to the memory system 210 fully booting up.

To measure the primary boot image, the memory system controller 215 may generate a cryptographic digest for the primary boot image using a same hashing function or algorithm used to generate the trusted cryptographic digest. Upon generating the cryptographic digest for the primary boot image, the memory system controller 215 may compare the cryptographic digest with the trusted cryptographic digest. The memory system controller 215 may determine whether one or more errors exist in the primary boot image based on comparing the cryptographic digest to the trusted cryptographic digest. For example, the memory system controller 215 may determine that one or more errors exist in the primary boot image by determining that the cryptographic digest does not match the trusted cryptographic digest. Alternatively, the memory system controller 215 may determine that no errors (or relatively few errors) exist in the primary boot image by determining that the cryptographic digest matches the trusted cryptographic digest.

When the cryptographic digest matches the trusted cryptographic digest, the memory system controller 215 may load the primary boot image (e.g., execute the code stored to the boot partition 230-$b$) and the memory system 210 may be booted. In some other cases, the memory system controller 215 may determine that one or more errors exist in the primary boot image based on the cryptographic digest not matching the trusted cryptographic digest. In such instances, the memory system controller 215 may autonomously (e.g., automatically, without instruction from the host system 205) load the boot image stored to the boot partition 230-$c$. The boot image stored to the boot partition 230-$c$ may be designated as the primary boot image and the memory system controller 215 may, in some instances, verify the integrity of the recovery boot image by generating a cryptographic digest and comparing the generated cryptographic digest to the trusted cryptographic digest. By autonomously loading the recovery boot image, the memory system 210 may avoid potential errors that may have occurred due to loading (or attempting to load) the corrupt primary boot image.

In some examples, the logical partitions 230 may also be utilized when updating the primary boot image. For example, upon booting the memory system 210 (or the computing system 200), it may be desirable to update the primary boot image. Accordingly, the memory system controller 215 may receive a command from the host system 205 that includes an updated boot image. By way of example, the memory system 210 may have been booted using the boot image stored to the boot partition 230-b. Accordingly, upon receiving the command to update the primary boot image, the memory system controller 215 may designate a partition 230 (e.g., a partition other than the boot partition 230-c, a third boot partition) as the recovery partition. A copy of the recovery boot image may be stored to the third boot partition (e.g., the recovery boot image may be copied from the partition 230-c and stored to the third boot partition).

After copying the recovery boot image, the boot image stored to the boot partition 230-c may be updated using the updated boot image received from the host system 205. Upon updating the boot image stored to the boot partition 230-c, the boot partition 230-c may be designated as the primary boot partition. Accordingly, during a subsequent boot operation, the updated boot image store to the boot partition 230-c may be loaded (e.g., upon being verified). After successfully updating the boot image, the boot partition 230-, the third boot partition, or any partition 230 may be designated as a recovery partition. Accordingly, any partition 230 of the memory system 210 may be designated as a primary boot partition or a recovery boot partition. Moreover, any of the partitions 230 may be utilized when updating a boot image. By autonomously loading recovery partitions and updating partitions 230 as described herein, the memory system 210 may provide a flexible architecture and catastrophic errors that would otherwise occur due to a manual-partition-shifting process may be mitigated.

Figure 3:
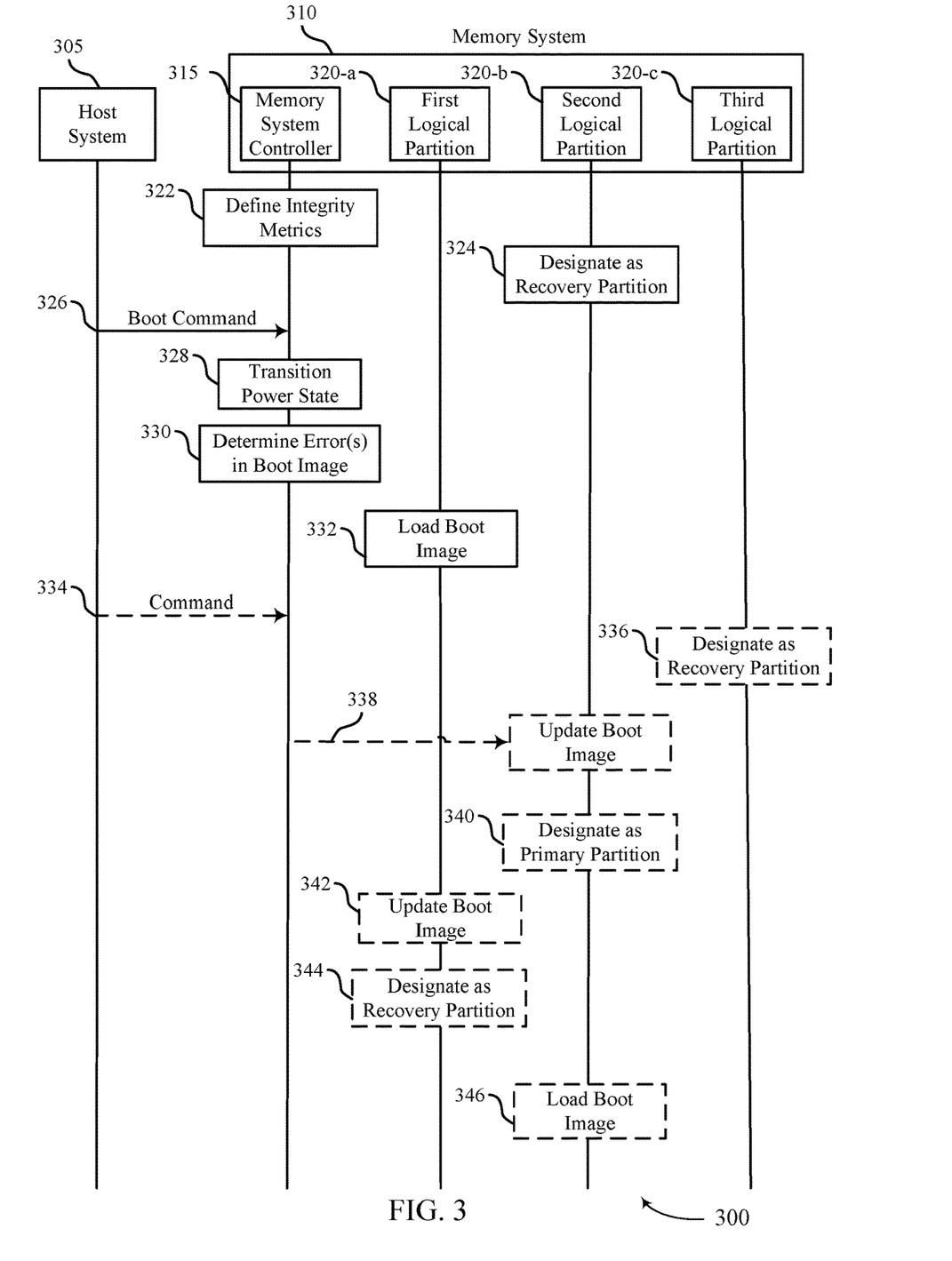
FIG. 3 illustrates an example of a process flow diagram that supports memory recovery partitions in accordance with examples as disclosed herein.

FIG. 3 illustrates an example of a process flow diagram 300 that supports memory recovery partitions in accordance with examples as disclosed herein. The process flow diagram 300 may illustrate aspects or operations of a system 100 or 200 as described with reference to FIGS. 1 and 2, respectively. For example, the process flow diagram 300 may depict operations at a host system 305 and at a memory system 310, which may be examples of host system 105 and 205 and memory system 110 and 210, as described with reference to FIGS. 1 and 2 respectively. In some cases, the memory system 310 may be configured to autonomously (e.g., automatically) load a boot image from a recovery partition upon detecting an error when loading a boot image from the primary partition. By autonomously loading recovery partitions, the memory system 310 may provide a flexible architecture and catastrophic errors that would otherwise occur due to a manual-partition-shifting process may be mitigated.

At 322, the memory system controller 315 may define one or more integrity metrics for loading a boot image. For example, the memory system controller 315 may select a hashing function for generating a trusted cryptographic digest. The hashing function may be selected based on one or more metrics such as desired system, desired system security, and other similar metrics. Additionally or alternatively, during or prior to step 322 the primary boot image may be stored to the first logical partition 320-a and the memory system controller 315 may generate the trusted cryptographic digest using the primary boot image.

At 324, the memory system controller 315 may designate the second logical partition 320-b as a recovery partition. As described herein, a boot image stored to the recovery partition may be autonomously loaded upon one or more errors associated with the primary boot image being detected. In some examples, upon the second logical partition 320-b being selected as the recovery partition, a copy (e.g., a backup copy, a recovery copy) of the primary boot image may be stored to the second logical partition 320-b.

At 326, the host system 305 may transmit a boot command to the memory system 310. In some cases, the host system controller may transmit the boot command and the memory system controller 315 may receive the boot command.

At 328, the memory system 310 may transition from a first power state (e.g., a low power state, a reduced power state, an off state, a deep sleep state) to a second power state (e.g., an active state, an on state). The memory system controller 315 may initiate transitioning the memory system 310 from the first power state to the second power state in response to receiving the boot command (e.g., at 326).

At 330, the memory system controller 315 may determine whether any errors exist in the primary boot image (e.g., the boot image stored to the first logical partition 320-a). For example, the memory system controller 315 may generate a cryptographic digest for the primary boot image (e.g., the memory system controller 315 may measure the primary boot image) and may compare the cryptographic digest to the trusted cryptographic digest. As described herein, whether the primary boot image or the recovery boot image is loaded is based on whether the cryptographic digest matches the trusted cryptographic digest. For example, if the digests match the process flow diagram 300 may continue to steps 332-342. If the digests do not match, the process flow diagram 300 may continue to steps 344-354.

At 332, the primary boot image may be loaded from the first logical partition 320-a based on the generated cryptographic digest matching the trusted cryptographic digest. In some examples, the memory system 310 (or a computing system that includes the host system 305 and the memory system 310) may be booted based on loading the boot image stored to the first logical partition 320-a.

At 334, the memory system controller 315 may receive a command from the host system 305. In some examples, the command may be an update command and may include an updated boot image for storing at the memory system 310.

At 336, the third logical partition 320-c may be designated as a recovery partition. In some examples, a copy of the primary boot image may be copied to (e.g., written to) the third logical partition 320-c from the first logical partition 320-a.

At 338, the updated boot image may be stored to the second logical partition 320-b. In some examples, data stored to the second logical partition 320-b may be overwritten by the data included in the command received (e.g., at 334). In other examples, a portion of the data stored to the second logical partition 320-b may be updated or overwritten by the data included in the command received (e.g., at 334). At 340, upon the boot image being updated, the second logical partition 320-b may be designated as the primary partition.

At 342, the boot image stored to the first logical partition 320-a may be updated based on the primary boot image. In some examples, a copy of the primary boot image may be copied to (e.g., written to) the first logical partition 320-a from the second logical partition 320-b. At 344, upon the boot image being updated, the first logical partition 320-a may be designated as the recovery partition. In other examples (not shown), the recovery boot image stored to the third logical partition 320-*c* may instead be updated and the third logical partition 320-*c* may remain as the recovery partition.

At 346, the boot image stored to the second logical partition 320-*b* may be loaded. In some examples, the boot image stored to the second logical partition 320-*b* may be a recovery boot image and may be loaded automatically (e.g., autonomously, without any signaling from the host system 305) based on the memory system controller 315 determining an error in the primary boot image (e.g., at 330). In such examples, the memory system controller 315 may generate a cryptographic digest for the recovery boot image and may load the recovery boot image based on the cryptographic digest matching the trusted cryptographic digest.

In other examples, the boot image stored to the second logical partition 320-*b* may be a primary boot image and may be loaded based on the memory system controller 315 receiving a boot command from the host system 305. In such examples, upon receiving the boot command, the memory system controller 315 may generate a cryptographic digest for the recovery boot image and may load the primary boot image based on the cryptographic digest matching the trusted cryptographic digest. If the cryptographic digest does not match the trusted cryptographic digest, the memory system controller 315 may load the recovery boot image stored to the first logical partition 320-*a* (or the third logical partition 320-*c*) as described herein.

Although the first logical partition 320-*a* and the second logical partition 320-*b* are described as storing a primary boot image, a primary boot image may be stored to any logical partition of a memory system 310. Moreover, a recovery partition may be stored to any logical partition of a memory system 310, and any logical partition may be utilized to update a primary boot image. By autonomously loading recovery partitions and updating partitions as described herein, the memory system 310 may provide a flexible architecture and catastrophic errors that would otherwise occur due to a manual-partition-shifting process may be mitigated.

Figure 4:
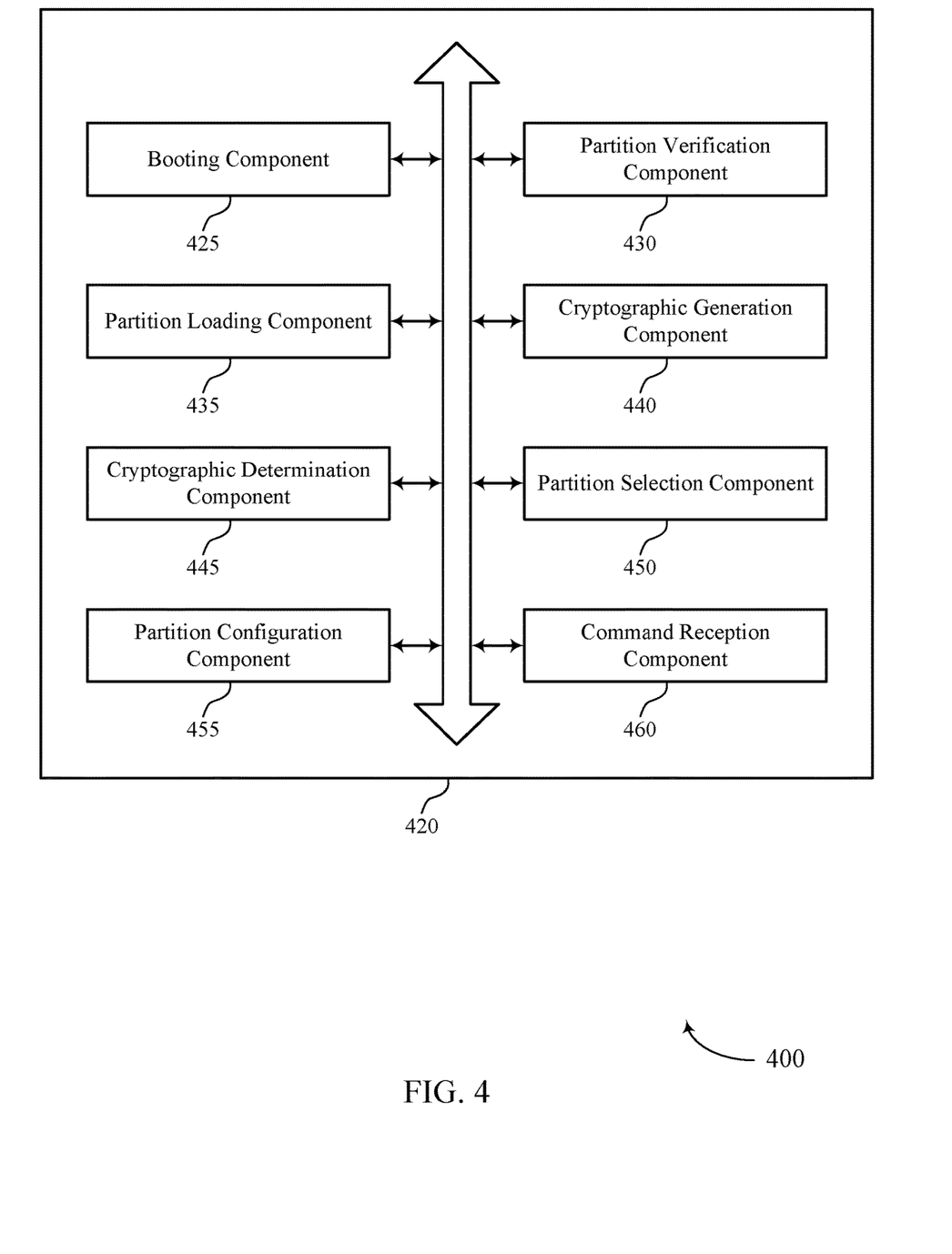
FIG. 4 shows a block diagram of a memory system that supports memory recovery partitions in accordance with examples as disclosed herein.

FIG. 4 shows a block diagram 400 of a memory system 420 that supports memory recovery partitions in accordance with examples as disclosed herein. The memory system 420 may be an example of aspects of a memory system as described with reference to FIGS. 1 and 2. The memory system 420, or various components thereof, may be an example of means for performing various aspects of memory recovery partitions as described herein. For example, the memory system 420 may include a booting component 425, a partition verification component 430, a partition loading component 435, a cryptographic generation component 440, a cryptographic determination component 445, a partition selection component 450, a partition configuration component 455, a command reception component 460, or any combination thereof. Each of these components may communicate, directly or indirectly, with one another (e.g., via one or more buses).

The booting component 425 may be configured as or otherwise support a means for transitioning, by a memory system, from a first power state to a second power state. The partition verification component 430 may be configured as or otherwise support a means for determining whether a first boot image stored to a first logical partition of the memory system includes one or more errors based at least in part on transitioning from the first power state to the second power state. The partition loading component 435 may be configured as or otherwise support a means for loading, autonomously by the memory system, a second boot image stored to a second logical partition of the memory system based at least in part on determining that the first boot image stored to the first logical partition of the memory system includes one or more errors.

In some examples, the partition loading component 435 may be configured as or otherwise support a means for loading the first boot image stored to the first logical partition of the memory system based at least in part on determining that the first boot image stored to the first logical partition of the memory system does not include one or more errors.

In some examples, the partition selection component 450 may be configured as or otherwise support a means for designating a third logical partition of the memory system as a recovery partition for the first logical partition based at least in part on loading the first boot image stored to the first logical partition of the memory system. In some examples, the partition configuration component 455 may be configured as or otherwise support a means for updating the second boot image stored to the second logical partition of the memory system based at least in part on designating the third logical partition of the memory system as the recovery partition for the first logical partition.

In some examples, the partition selection component 450 may be configured as or otherwise support a means for designating the second logical partition of the memory system as a primary partition based at least in part on updating the second boot image stored to the second logical partition. In some examples, the partition configuration component 455 may be configured as or otherwise support a means for updating the first boot image stored to the first logical partition of the memory system based at least in part on designating the second logical partition of the memory system as the primary partition. In some examples, the partition selection component 450 may be configured as or otherwise support a means for designating the first boot image as the recovery partition for the second logical partition based at least in part on updating the first boot image stored to the first logical partition of the memory system.

In some examples, the command reception component 460 may be configured as or otherwise support a means for receiving, from a host system, a command including data for updating the second boot image.

In some examples, to support determining whether the first boot image stored to the first logical partition of the memory system includes the one or more errors, the cryptographic generation component 440 may be configured as or otherwise support a means for generating, by the memory system, a cryptographic digest for the first boot image based at least in part on the memory system transitioning from the first power state to the second power state. In some examples, to support determining whether the first boot image stored to the first logical partition of the memory system includes the one or more errors, the cryptographic determination component 445 may be configured as or otherwise support a means for comparing, by the memory system, the generated cryptographic digest to a trusted cryptographic digest for the first boot image.

In some examples, the cryptographic determination component 445 may be configured as or otherwise support a means for determining that the generated cryptographic digest for the first boot image does not match the trusted cryptographic digest based at least in part on comparing the generated cryptographic digest to the trusted cryptographic digest, where loading the second boot image stored to the second logical partition of the memory system is based at least in part on determining that the generated cryptographic digest for the first boot image does not match the trusted cryptographic digest.

In some examples, the second logical partition includes a recovery partition. In some examples, the second boot image includes a backup of the first boot image.

In some examples, the partition selection component 450 may be configured as or otherwise support a means for designating the second logical partition as a recovery partition prior to determining whether the first boot image stored to a first logical partition of the memory system includes the one or more errors, where the second boot image includes a backup of the first boot image.

In some examples, transitioning from the first power state to the second power state occurs in connection with a boot procedure for one or more components of a computing system that includes the memory system and one or more host systems. In some examples, the first boot image and the second boot image are for booting one or more components of the computing system.

In some examples, to support loading, autonomously by the memory system, the second boot image, the partition loading component 435 may be configured as or otherwise support a means for loading, by the memory system, the second boot image without receiving an indication of the second logical partition or an indication of the second boot image from a host system subsequent to transitioning from the first power state to the second power state and prior to loading the second boot image.

Figure 5:
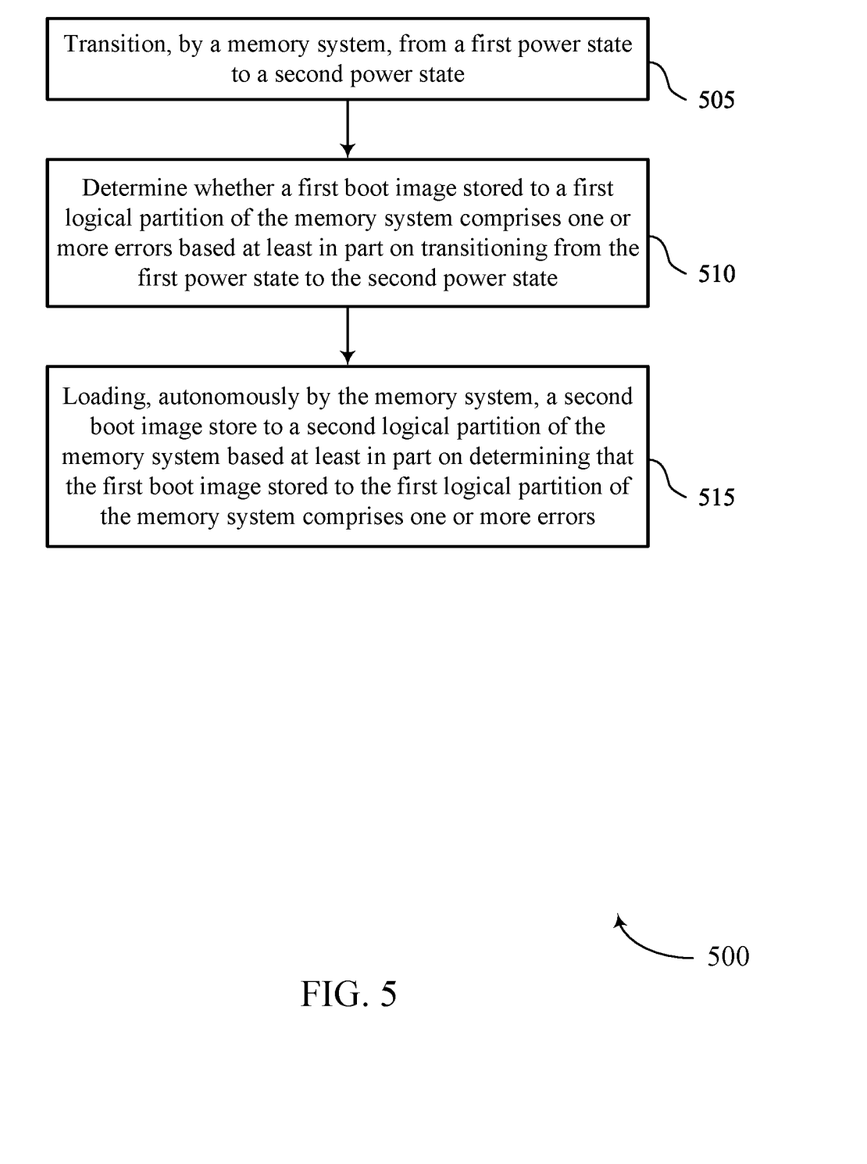
FIG. 5 shows a flowchart illustrating a method or methods that support memory recovery partitions in accordance with examples as disclosed herein.

FIG. 5 shows a flowchart illustrating a method 500 that supports memory recovery partitions in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include transitioning, by a memory system, from a first power state to a second power state. The operations of 505 may be performed in accordance with examples as disclosed herein. In some examples, aspects of the operations of 505 may be performed by a booting component 425 as described with reference to FIG. 4.

At 510, the method may include determining whether a first boot image stored to a first logical partition of the memory system includes one or more errors based at least in part on transitioning from the first power state to the second power state. The operations of 510 may be performed in accordance with examples as disclosed herein. In some examples, aspects of the operations of 510 may be performed by a partition verification component 430 as described with reference to FIG. 4.

At 515, the method may include loading, autonomously by the memory system, a second boot image stored to a second logical partition of the memory system based at least in part on determining that the first boot image stored to the first logical partition of the memory system includes one or more errors. The operations of 515 may be performed in accordance with examples as disclosed herein. In some examples, aspects of the operations of 515 may be performed by a partition loading component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transitioning, by a memory system, from a first power state to a second power state; determining whether a first boot image stored to a first logical partition of the memory system includes one or more errors based at least in part on transitioning from the first power state to the second power state; and loading, autonomously by the memory system, a second boot image stored to a second logical partition of the memory system based at least in part on determining that the first boot image stored to the first logical partition of the memory system includes one or more errors.

Aspect 2: The method, apparatus, or non-transitory computer-readable medium of aspect 1, further including operations, features, circuitry, logic, means, or instructions, or any combination thereof for loading the first boot image stored to the first logical partition of the memory system based at least in part on determining that the first boot image stored to the first logical partition of the memory system does not include one or more errors.

Aspect 3: The method, apparatus, or non-transitory computer-readable medium of aspect 2, further including operations, features, circuitry, logic, means, or instructions, or any combination thereof for designating a third logical partition of the memory system as a recovery partition for the first logical partition based at least in part on loading the first boot image stored to the first logical partition of the memory system and updating the second boot image stored to the second logical partition of the memory system based at least in part on designating the third logical partition of the memory system as the recovery partition for the first logical partition.

Aspect 4: The method, apparatus, or non-transitory computer-readable medium of aspect 3, further including operations, features, circuitry, logic, means, or instructions, or any combination thereof for designating the second logical partition of the memory system as a primary partition based at least in part on updating the second boot image stored to the second logical partition; updating the first boot image stored to the first logical partition of the memory system based at least in part on designating the second logical partition of the memory system as the primary partition; and designating the first boot image as the recovery partition for the second logical partition based at least in part on updating the first boot image stored to the first logical partition of the memory system.

Aspect 5: The method, apparatus, or non-transitory computer-readable medium of any of aspects 3 through 4, where operations, features, circuitry, logic, means, or instructions, or any combination thereof for updating the second boot image stored to the second logical partition include operations, features, circuitry, logic, means, or instructions, or any combination thereof for receiving, from a host system, a command including data for updating the second boot image.

Aspect 6: The method, apparatus, or non-transitory computer-readable medium of any of aspects 1 through 5, where operations, features, circuitry, logic, means, or instructions, or any combination thereof for determining whether the first boot image stored to the first logical partition of the memory system include the one or more errors includes operations, features, circuitry, logic, means, or instructions, or any combination thereof for generating, by the memory system, a cryptographic digest for the first boot image based at least in part on the memory system transitioning from the first power state to the second power state and comparing, by the memory system, the generated cryptographic digest to a trusted cryptographic digest for the first boot image.

Aspect 7: The method, apparatus, or non-transitory computer-readable medium of aspect 6, further including operations, features, circuitry, logic, means, or instructions, or any combination thereof for determining that the generated cryptographic digest for the first boot image does not match the trusted cryptographic digest based at least in part on comparing the generated cryptographic digest to the trusted cryptographic digest, where loading the second boot image stored to the second logical partition of the memory system is based at least in part on determining that the generated cryptographic digest for the first boot image does not match the trusted cryptographic digest.

Aspect 8: The method, apparatus, or non-transitory computer-readable medium of aspect 7, where the second logical partition includes a recovery partition and the second boot image includes a backup of the first boot image.

Aspect 9: The method, apparatus, or non-transitory computer-readable medium of any of aspects 1 through 8, further including operations, features, circuitry, logic, means, or instructions, or any combination thereof for designating the second logical partition as a recovery partition prior to determining whether the first boot image stored to a first logical partition of the memory system includes the one or more errors, where the second boot image includes a backup of the first boot image.

Aspect 10: The method, apparatus, or non-transitory computer-readable medium of any of aspects 1 through 9, where transitioning from the first power state to the second power state occurs in connection with a boot procedure for one or more components of a computing system that includes the memory system and one or more host systems and the first boot image and the second boot image are for booting one or more components of the computing system.

Aspect 11: The method, apparatus, or non-transitory computer-readable medium of any of aspects 1 through 10, where operations, features, circuitry, logic, means, or instructions, or any combination thereof for loading, autonomously by the memory system, the second boot image include operations, features, circuitry, logic, means, or instructions, or any combination thereof for loading, by the memory system, the second boot image without receiving an indication of the second logical partition or an indication of the second boot image from a host system subsequent to transitioning from the first power state to the second power state and prior to loading the second boot image.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action.

In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily doped, e.g., degenerate, semiconductor region. The source and drain may be separated by a lightly doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a memory system comprising non-volatile memory cells; and
    processing circuitry coupled with the memory system and configured to cause the apparatus to:
        transition from a first power state to a second power state; and
        load, autonomously and based at least in part on transitioning from the first power state to the second power state, a second boot image stored to a second logical partition of the memory system based at least in part on a first boot image stored to a first logical partition of the memory system comprising one or more errors.

2. The apparatus of claim 1, wherein the processing circuitry is further configured to cause the apparatus to:
    load the first boot image stored to the first logical partition of the memory system based at least in part on determining that the first boot image stored to the first logical partition of the memory system does not comprise one or more errors.

3. The apparatus of claim 2, wherein the processing circuitry is further configured to cause the apparatus to:
    designate a third logical partition of the memory system as a recovery partition for the first logical partition based at least in part on loading the first boot image stored to the first logical partition of the memory system; and
    update the second boot image stored to the second logical partition of the memory system based at least in part on designating the third logical partition of the memory system as the recovery partition for the first logical partition.

4. The apparatus of claim 3, wherein the processing circuitry is further configured to cause the apparatus to:
    designate the second logical partition of the memory system as a primary partition based at least in part on updating the second boot image stored to the second logical partition;
    update the first boot image stored to the first logical partition of the memory system based at least in part on designating the second logical partition of the memory system as the primary partition; and
    designate the first boot image as the recovery partition for the second logical partition based at least in part on updating the first boot image stored to the first logical partition of the memory system.

5. The apparatus of claim 1, wherein, to update the second boot image stored to the second logical partition, the processing circuitry is configured to cause the apparatus to:
    receive, from a host system, a command comprising data for updating the second boot image.

6. The apparatus of claim 1, wherein, to determine whether the first boot image stored to the first logical partition of the memory system comprises the one or more errors, the processing circuitry is configured to cause the apparatus to:
    generate a cryptographic digest for the first boot image based at least in part on the memory system transitioning from the first power state to the second power state; and
    compare the generated cryptographic digest to a trusted cryptographic digest for the first boot image.

7. The apparatus of claim 6, wherein the processing circuitry is further configured to cause the apparatus to:
    determine that the generated cryptographic digest for the first boot image does not match the trusted cryptographic digest based at least in part on comparing the generated cryptographic digest to the trusted cryptographic digest, wherein loading the second boot image stored to the second logical partition of the memory system is based at least in part on determining that the generated cryptographic digest for the first boot image does not match the trusted cryptographic digest.

8. The apparatus of claim 7, wherein:
    the second logical partition comprises a recovery partition, and
    the second boot image comprises a backup of the first boot image.

9. The apparatus of claim 1, wherein the processing circuitry is further configured to cause the apparatus to:
    designate the second logical partition as a recovery partition prior to determining whether the first boot image stored to a first logical partition of the memory system comprises the one or more errors, wherein the second boot image comprises a backup of the first boot image.

10. The apparatus of claim 1, wherein the processing circuitry is configured to cause the apparatus to:
    transition from the first power state to the second power state in connection with a boot procedure for one or more components of a computing system that comprises the memory system and one or more host systems, and wherein the first boot image and the second boot image are for booting one or more components of the computing system.

11. The apparatus of claim 1, wherein, to load the second boot image, the processing circuitry is configured to cause the apparatus to:
    load the second boot image without receiving an indication of the second logical partition or an indication of the second boot image from a host system subsequent to transitioning from the first power state to the second power state and prior to loading the second boot image.

12. A non-transitory computer-readable medium storing code comprising instructions which, when executed by a processing circuitry of an electronic device, cause the electronic device to:
    transition from a first power state to a second power state; and
    load, autonomously and based at least in part on transitioning from the first power state to the second power state, a second boot image stored to a second logical partition of a memory system based at least in part on a first boot image stored to a first logical partition of the memory system comprising one or more errors.

13. The non-transitory computer-readable medium of claim 12, wherein the instructions, when executed by the processing circuitry of the electronic device, further cause the electronic device to:
load the first boot image stored to the first logical partition of the memory system based at least in part on determining that the first boot image stored to the first logical partition of the memory system does not comprise one or more errors.

14. The non-transitory computer-readable medium of claim 13, wherein the instructions, when executed by the processing circuitry of the electronic device, further cause the electronic device to:
designate a third logical partition of the memory system as a recovery partition for the first logical partition based at least in part on loading the first boot image stored to the first logical partition of the memory system;
receive, from a host system, a command comprising data for updating the second boot image; and
update the second boot image stored to the second logical partition of the memory system based at least in part on designating the third logical partition of the memory system as the recovery partition for the first logical partition.

15. The non-transitory computer-readable medium of claim 12, wherein, to determine whether the first boot image stored to the first logical partition of the memory system comprises the one or more errors, the instructions, when executed by the processing circuitry of the electronic device, cause the electronic device to:
generate a cryptographic digest for the first boot image based at least in part on the memory system transitioning from the first power state to the second power state;
compare the generated cryptographic digest to a trusted cryptographic digest for the first boot image; and
determine that the generated cryptographic digest for the first boot image does not match the trusted cryptographic digest based at least in part on comparing the generated cryptographic digest to the trusted cryptographic digest, wherein loading the second boot image stored to the second logical partition of the memory system is based at least in part on determining that the generated cryptographic digest for the first boot image does not match the trusted cryptographic digest.

16. The non-transitory computer-readable medium of claim 15, wherein:
the second logical partition comprises a recovery partition, and
the second boot image comprises a backup of the first boot image.

17. The non-transitory computer-readable medium of claim 12, wherein the instructions, when executed by the processing circuitry of the electronic device, further cause the electronic device to:
designate the second logical partition as a recovery partition prior to determining whether the first boot image stored to a first logical partition of the memory system comprises the one or more errors, wherein the second boot image comprises a backup of the first boot image.

18. The non-transitory computer-readable medium of claim 12, wherein the instructions, when executed by the processing circuitry of the electronic device, cause the electronic device to:
transition from the first power state to the second power state in connection with a boot procedure for one or more components of a computing system that comprises the memory system and one or more host systems, wherein the first boot image and the second boot image are for booting one or more components of the computing system.

19. The non-transitory computer-readable medium of claim 12, wherein, to load, autonomously, the second boot image, the instructions, when executed by the processing circuitry of the electronic device, cause the electronic device to:
load the second boot image without receive an indication of the second logical partition or an indication of the second boot image from a host system subsequent to transitioning from the first power state to the second power state and prior to loading the second boot image.

20. A method comprising:
transitioning, by a memory system, from a first power state to a second power state; and
loading, autonomously by the memory system based at least in part on transitioning from the first power state to the second power state, a second boot image stored to a second logical partition of the memory system based at least in part on a first boot image stored to a first logical partition of the memory system comprising one or more errors.

* * * * *